Patented Aug. 19, 1952

2,607,771

UNITED STATES PATENT OFFICE 2,607,771

PRODUCTION OF CELLULOSE ESTERS

Walter Henry Groombridge, Harold Bates, and James Wotherspoon Fisher, Spondon, near Derby, England, assignors to British Celanese Limited, a corporation of Great Britain No Drawing. Application July 15, 1950, Serial No. 174,132. In Great Britain August 31, 1949

10 Claims. (Cl. 260—227)

This invention relates to the production of organic acid esters of cellulose.

It is an object of the invention to provide a method of esterifying cellulose, and especially of acetylating cellulose, which can be carried out on a continuous or semi-continuous basis.

According to the invention, cellulose is treated with an esterification liquor which comprises the organic acid anhydride corresponding to the ester to be produced, a diluent therefor which is a non-solvent for the cellulose ester and is present in amount such that the cellulose ester formed is not dissolved in the liquor, and a catalyst for the esterification, and as the reaction proceeds the liquor is fortified by the addition of the appropriate ketene in amount sufficient to regenerate substantially all the anhydride consumed. Preferably the liquor is withdrawn from the esterification zone before being fortified, and is at once replaced by fortified liquor. It is particularly advantageous to carry out the esterification in a vessel or vessels into which fortified liquor is fed and from which used liquor is withdrawn continuously or intermittently throughout the esterification. (The term "used liquor" is employed to indicate liquor in which some part of its content of organic acid anhydride has been consumed by reaction with the cellulose, but implies no limitation with respect to the amount so consumed.) The process can be carried out on a continuous basis in a vessel or vessels into which cellulose is fed and from which the cellulose ester is withdrawn and through which the esterification liquor flows, continuously or intermittently; or it can be carried out on a semi-continuous basis employing a series of vessels fed by a common continuous or intermittent stream or from a common pool of esterification liquor, the cellulose being introduced into and the cellulose ester withdrawn from the individual vessels in batches.

For the sake of conciseness the invention will be described in more detail with particular reference to the production of cellulose acetate by the reaction of cellulose with acetic anhydride and the regeneration of the acetic anhydride by means of ketene itself; it will however be understood that the process can be similarly applied mutasis mutandis to the production of other cellulose esters, especially cellulose propionate and cellulose butyrate.

Any reasonably pure form of cellulose may be employed as the raw material for the production of cellulose acetate in accordance with the invention. Cotton linters are a very suitable form of cellulose, but high quality wood or straw pulps can also be used, especially pulps having an alpha-cellulose content above about 90% and preferably above 95%, and a low pentosan content, preferably about or below 1.5%.

The cellulose is preferably given an activating pre-treatment to increase its reactivity towards the acetylation liquor. Thus it may be treated in the cold or at an elevated temperature with a lower fatty acid, preferably acetic acid, which may contain a certain amount of the catalyst to be used in the acetylation and/or sufficient acetic anhydride to combine with the moisture contained in the cellulose. On the other hand the pre-treatment may be effected with fatty acid containing some water, e. g. aqueous acetic acid of concentration above 75%, with or without acetylation catalyst, but this has the disadvantage of increasing the amount of acetic anhydride consumed.

The acetylation liquor comprises acetic anhydride, the diluent, the catalyst, and preferably also a swelling agent for cellulose. It is usually preferable to employ a liquor containing more than 50% by weight of acetic anhydride, for example between 55% and 70%. The diluent is preferably a normally liquid aromatic hydrocarbon, e. g. benzene, toluene, ethyl benzene, or one or more of the xylenes. The swelling agent is preferably acetic acid, but other suitable agents, e. g. methylene chloride, ethylene dichloride, or sulphur dioxide, may be employed if desired, whether or not there is also present acetic acid in addition to that necessarily formed in the acetylation. The proportions of diluent and swelling agent in relation to each other and to the proportion of acetic anhydride are of course such that the cellulose triacetate formed remains undissolved. Preferably acetic acid is employed as swelling agent in amount such that, when acetic acid carried over from a pre-treatment but not that formed in the acetylation is allowed for, the ratio of acetic acid to diluent by weight is not less than 1:2.

As the catalyst it is preferred to employ perchloric acid, for example in amount between about 0.5% and 2% of the weight of the cellulose. Other catalysts may be used however, for example sulphuric acid in amount about 1%–5% of the weight of the cellulose.

As is well known, the acetylation of cellulose is an exothermic reaction, and it is necessary to cool the reactants in order to prevent serious degradation of the cellulose molecule. For example, the cellulose or the acetylation liquor or both may be cooled before they enter the reaction zone, e. g. to a temperature between about —10° and 5° C.; alternatively or in addition, the vessel or vessels in which the acetylation is carried out may be equipped with suitable cooling means, e. g. jackets or internal passages for a cooling fluid. The temperature which is allowed to develop in any particular case will depend on the viscosity desired in the product, the higher the desired viscosity the lower being the maximum temperature. In general temperatures between about 25° C. for high viscosity products and 40° C. for lower viscosity products may be used; even higher temperatures, e. g. temperatures up to about 55° C., can be employed if desired in the production of a relatively low viscosity cellulose acetate.

The acetylation reaction converts the cellulose into cellulose triacetate with substantially the maximum theoretical acetyl value of 62.5% calculated as acetic acid, and when this stage has been reached the cellulose triacetate, which retains the fibrous form of the original cellulose, is preferably freed as far as possible from the acetylation liquor by drainage or compression or some analogous means, and is then washed and treated with a neutralising agent to neutralise the catalyst. Preferably it is washed with further quantities of the diluent, and the wash liquors first employed contain a neutralising compound of an alkali metal, an alkaline earth metal, or magnesium. Very suitably the acetate of one of these metals dissolved in acetic acid may be added to the diluent employed in the first stages of the washing, the amount of the neutralising agent preferably being substantially more than the equivalent of the acid catalyst remaining on the cellulose triacetate. Later stages of the wash may then be carried out with diluent free from acetic acid and neutralising agent. When the cellulose triacetate has been washed substantially free from acetic acid it may be immersed in water and the diluent remaining may be removed by steam distillation; the cellulose triacetate, if desired after being washed with water, may then be dried.

Acetylation liquor withdrawn from the acetylation vessel or vessels during the process is fortified by adding to it ketene, which reacts with acetic acid in the liquor to regenerate acetic anhydride. This reaction also is exothermic, and it is usually necessary to provide means for cooling the fortified liquor before returning it to the acetylation zone, whether or not the liquor is to be introduced into the acetylation zone at a temperature below room temperature.

As time goes on impurities derived from the cellulose tend to accumulate in the circulating acetylation liquor. It is not practicable to remove cellulose triacetate from the acetylation zone without at the same time taking with it a certain amount of adherent or absorbed acetylation liquor (which is of course removed in the subsequent washing), and this enforced regular removal of part of the liquor from the system may be turned to account by treating the washings so as to recover acetic anhydride, acetic acid, diluent and catalyst in a purified form for re-use. If desired this effect may be supplemented by separating off a small fraction of the acetylation liquor leaving the acetylation zone before fortifying the bulk of the liquor, and adding this separated liquor to the washings before they are treated for the recovery of the components of the acetylation liquor, or purifying it separately.

Before recirculating the fortified acetylation liquor it is advisable to compensate for the various components removed with the cellulose triacetate, and in a separating step as described if this is adopted. Fresh acetic anhydride may for example be added to the liquor, or an equimolecular amount of acetic acid may be added which can be converted into acetic anhydride by ketene in the fortification step. The diluent may be made up by direct addition, and acetic acid and catalyst either by direct addition before or after the fortification of the liquor or partly or wholly in the pre-treatment of the cellulose. When any or all of the components of the liquor are added to the circulating liquor outside the acetylation vessel or vessels, this is preferably done before the addition of the ketene, so as the more easily to achieve uniform mixing of the added materials with the bulk of the liquor.

In a preferred method of carrying out the invention the acetylation of the cellulose is performed on a completely continuous basis by passing the cellulose undergoing acetylation and the acetylation liquor in opposite directions through an acetylation vessel. Vessels suitable for this process are described in U. S. Patents Nos. 2,337,137 and 2,433,552. They comprise rotatable cylindrical vessels divided into a number of compartments by baffles, each baffle being provided with separate openings and feeding means for solids and for liquids so arranged that as the vessel is rotated solids are caused to pass from one compartment to the next in one direction while liquid passes in the other direction. Details of the construction of these vessels will be found in the patents referred to.

In using these vessels in the process of the present invention it will be convenient to employ them in sets of two or more, the first vessel in each set being used as an acetylator and the remainder for washing the cellulose triacetate. If desired, however, other arrangements may be employed; for example, the cellulose undergoing acetylation may be passed successively through two vessels, in which acetylation liquors of different composition may be used; for example in the first the liquor may contain a higher proportion of acetic acid and a lower proportion of benzene than in the second. For the purposes of the present invention, means may if desired be provided for cooling the vessel or vessels employed as acetylators.

Cellulose which has been given a pre-treatment with acetic acid or other activating agent may be introduced at the appropriate end of one of the said vessels and acetylation liquor may be introduced at the other end. Preferably, the acetylation liquor is caused to pass through the vessel much the more rapidly; for instance weight for weight between 15 and 30 times as fast as the cellulose undergoing acetylation. On leaving the vessel the used acetylation liquor is fortified and its composition adjusted as already described, and then after being cooled it is returned to the liquid input end of the vessel. The cellulose triacetate on leaving the vessel is preferably drained or compressed or given some other treatment to remove part of the liquor adhering to it. The liquor so obtained, being partly liquor which has only recently entered the vessel, may if desired be returned to the liquid input end of the vessel instead of being added to the used liquor leaving the other end. The cellulose triacetate may then be passed to a second vessel of the same kind as the first, in which it is washed with diluent containing a neutralising agent dissolved in acetic acid, and then it may be transferred to a third vessel in which it is washed with diluent free from acetic acid. The washings may of course be treated to recover the neutralised catalyst and acetic acid and any acetic anhydride they may contain. The washed cellulose triacetate may be freed from diluent and given any desired after-treatment.

The acetylation may also be carried out on a semi-continuous basis in acetylators through which the liquor is caused to flow continuously or intermittently but into which the cellulose is introduced batchwise and from which the cellulose triacetate formed is removed batchwise. It is advantageous to employ such acetylators in a series or circuit so arranged that the completion of acetylation occurs in a regular sequence throughout the series or circuit.

A suitable form of acetylator for a process of this type consists of a vessel provided with one or more inlets and outlets for the acetylation liquor and adapted to contain a perforated rotating drum in which the pre-treated cellulose is placed. Preferably the drum is a fairly close fit in the lower half of the vessel. To discharge and recharge the acetylator the drum may be removed bodily and replaced by another containing fresh pre-treated cellulose, and the cellulose triacetate may be washed while still in the drum in which it was made. When employing a device of this kind the flow of acetylation liquor through the acetylator need not be interrupted, the drum containing the cellulose triacetate being held above the surface of the liquor until as much of the liquor as practicable has been drained therefrom. Alternatively, the flow of acetylation liquor into the acetylator may be stopped, e. g. by making use of a by-pass, and the drum drained while still in its working position.

In operating a semi-continuous process of this kind the acetylation liquor may be caused to flow in a circuit through any desired number of acetylators, means being provided between each pair of acetylators for mixing in the ketene required for the fortification and such components of the liquor as may be needed to compensate for losses as already described. It is, however, easier to ensure that the composition of the liquor entering the acetylators is constant if each acetylator is fed from and discharged into a common pool of acetylation liquor, in which the ketene and any other substances required may be added to the liquor and in which also the liquor may be continuously stirred or otherwise kept in turbulent motion. If desired a small proportion, say 2-5%, of the acetylation liquor leaving each acetylator may be separated from the bulk of the acetylation liquor and treated so as to recover the various components in a purified form.

For many purposes it will be desirable to convert the fibrous cellulose triacetate obtained by the process of the invention into an acetone-soluble ester of lower acetyl content, i. e. to ripen it. To this end the cellulose triacetate is preferably dissolved in a suitable solvent containing a ripening agent and a catalyst, e. g. sulphuric acid or preferably hydrochloric acid. Thus the ester may be dissolved in acetic acid containing a small proportion of water and a little hydrochloric or sulphuric acid, and the solution may be allowed to stand, or may be stirred or otherwise agitated, either at room temperature or at a higher temperature until the ester has the desired acetyl value and solubility properties.

The ripening may, however, also be carried out by a novel process which is more fully described in U. S. application No. 174,131, filed July 15, 1950. This consists in dissolving the fibrous cellulose triacetate in a substantially anhydrous solvent mixture which is free from acetic acid and other organic carboxylic acids but which contains an alcohol and usually also a mineral acid which is a catalyst for alcoholysis reactions. Preferably the cellulose triacetate is dissolved in a mixture of methylene chloride and methanol containing about 8-15% and especially about 10% by volume of methanol, and containing also a small proportion of a mineral acid, especially hydrochloric acid in amount about 0.25%-5%, or sulphuric acid in amount about 0.5% to 5% of the dry weight of the cellulose triacetate. At very high temperatures, e. g. temperatures above about 120° C., the catalyst can be dispensed with. The solution may be allowed to stand or may be stirred or otherwise agitated either at room temperature or at a higher temperature, and if necessary under pressure, until ripening has proceeded to the desired degree. The catalyst may then be neutralised or the temperature lowered.

From the ripened solution the cellulose acetate may be obtained in the solid form or in solution, for instance in solution in anhydrous or 95% acetone. If a solid product is desired this may be obtained by mixing a non-solvent for the cellulose acetate, e. g., water or alcohol, into the solution so as to precipitate the cellulose acetate which may then be separated, e. g. by decanting or filtering off the liquid, and if desired washed and dried; or the methylene chloride and methanol with the methyl acetate formed in the ripening operation may be removed by distillation, preferably by adding to the solution a sufficient amount of hot or boiling water. If a solution in acetone is desired, this may be obtained directly by adding acetone to the ripened solution before or during removal of the methylene chloride, methanol and methyl acetate by distillation; in the course of the distillation a certain amount of acetone will also go over, and it is therefore necessary to add rather more acetone than is required in the final cellulose acetate solution, or else to add further acetone after the other solvents have been removed. Further details of the process will be found in U. S. application No. 174,131.

The particular process by reference to which the present invention has been described can be modified in a number of ways. Thus as already indicated diluents other than benzene can be employed, preferably other aromatic hydrocarbons, but instead, if desired, aliphatic hydrocarbons or ethers. For example, when the acetylation is to be carried out at a relatively high temperature, e. g. at temperatures reaching about 55° C., it may be advisable to replace the benzene by a higher aromatic hydrocarbon diluent, e. g. a mixture of xylenes. Variations may also be made in the ripening and other treatments described.

The invention is illustrated by the following example.

*Example*

The process here described makes use of an acetylator consisting of a rotating reactor divided into compartments and equipped with means for forwarding solids from one compartment to the next in one direction and liquids in the other direction such as is described in U. S. Patent No. 2,433,552.

Cellulose in the form of cotton linters or of purified wood pulp is pre-treated with about its own weight of acetic acid at about 25° C. for 6 hours, and is then fed to the solids-input end of a reactor of the type described. At the other end of the reactor an acetylation liquor is introduced having the approximate composition:

|                   | Per cent |
|-------------------|----------|
| Acetic anhydride  | 65       |
| Acetic acid       | 15       |
| Benzene           | 20       |
| Perchloric acid   | 0.05     |

The rate of travel of the acetylation liquor through the reactor is about 20 times that of the cellulose. The acetylation liquor is cooled before entering the reactor so that the temperature of the liquor in the reactor reaches but does not exceed 40° C.

On leaving the reactor the cellulose triacetate formed is drained and is then washed in two further vessels of the same kind. In the first it is washed with benzene to which has been added a little glacial acetic acid containing in solution more than sufficient sodium acetate to neutralize the catalyst, and in the second with benzene free from acetic acid; finally it is immersed in water and steamed so as to free it from benzene. The washings are treated to recover acetic acid, acetic anhydride and sodium perchlorate.

The acetylation liquor leaving the reactor is pumped to a combined mixer and cooler in which ketene is injected into the liquor, and in which acetic acid, benzene and catalyst are also added in amounts sufficient to compenste for the liquor removed from the reactor with the cellulose triacetate after allowing for the acetic acid added in the pre-treatment. The fortified liquor is then returned to the reactor.

Having described our invention, what we desire to secure by Letters Patent is:

1. A process for the continuous production of cellulose esters of lower aliphatic acids, which comprises bringing into contact with cellulose an esterification mixture comprising the anhydride of an aliphatic acid containing 2 to 4 carbon atoms in the molecule, a diluent therefor which is a non-solvent for the cellulose ester and is present in amount such that the esterification mixture as a whole is a non-solvent for the cellulose ester, and a catalyst for the esterification, removing the esterification mixture from the cellulose and immediately replacing it by further esterification mixture having substantially the same initial composition, adding to at least the greater part of the esterification mixture which has been removed from the cellulose sufficient of a ketone having 2 to 4 carbon atoms to restore its content of the acid anhydride, and employing the esterification mixture again in the process.

2. A process for the continuous production of cellulose acetate, which comprises bringing into contact with cellulose an acetylation mixture comprising acetic anhydride, a diluent therefor which is a non-solvent for the cellulose acetate and is present in amount such that the acetylation mixture as a whole is a non-solvent for the cellulose acetate, and a catalyst for the acetylation, removing the acetylation mixture from the cellulose and immediately replacing it by further acetylation mixture having substantially the same initial composition, adding to at least the greater part of the acetylation mixture which has been removed from the cellulose sufficient ketene to restore its content of the acetic anhydride, and employing the acetylation mixture again in the process.

3. A process for the continuous production of cellulose esters of lower aliphatic acids, which comprises bringing into contact with cellulose an esterification mixture comprising the anhydride of an aliphatic acid containing 2 to 4 carbon atoms in the molecule, a diluent therefor which is a non-solvent for the cellulose ester and is present in amount such that the esterification mixture as a whole is a non-solvent for the cellulose ester, and a catalyst for the esterification, removing the esterification mixture from the cellulose and immediately replacing it by further esterification mixture having substantially the same initial composition, adding to at least the greater part of the esterification mixture which has been removed from the cellulose sufficient of a ketene having 2 to 4 carbon atoms to restore its content of the acid anhydride, and employing the esterification mixture again in the process, the rate at which the esterification mixture is brought into contact with and removed from the cellulose being such that during the esterification the cellulose comes in contact with 15 to 30 times its weight of esterification mixture.

4. A process for the continuous production of cellulose acetate, which comprises bringing into contact with cellulose an acetylation mixture comprising acetic anhydride, a diluent therefor which is a non-solvent for the cellulose acetate and is present in amount such that the acetylation mixture as a whole is a non-solvent for the cellulose acetate, and a catalyst for the acetylation, removing the acetylation mixture from the cellulose and immediately replacing it by further acetylation mixture having substantially the same initial composition, adding to at least the greater part of the acetylation mixture which has been removed from the cellulose sufficient ketene to restore its content of the acetic anhydride, and employing the acetylation mixture again in the process, the rate at which the acetylation mixture is brought into contact with and removed from the cellulose being such that during the acetylation the cellulose comes in contact with 15 to 30 times its weight of acetylation mixture.

5. A process for the continuous production of cellulose esters of lower aliphatic acids, which comprises passing cellulose through an esterification zone in one direction, passing through the zone in the other direction and 15 to 30 times as fast weight for weight an esterification mixture comprising the anhydride of an aliphatic acid containing 2 to 4 carbon atoms in the molecule, a diluent therefor which is a non-solvent for the cellulose ester and is present in amount such that the esterification mixture as a whole is a non-solvent for the cellulose ester, and a catalyst for the esterification, adding to at least the greater part of the esterification mixture which has left the zone sufficient of a ketene having 2 to 4 carbon atoms to restore its content of the acid anhydride, and returning to the esterification zone the esterification mixture which has had its acid anhydride content so restored.

6. A process for the continuous production of cellulose acetate, which comprises passing cellulose through an acetylation zone in one direction, passing through the zone in the other direction and 15 to 30 times as fast weight for weight an acetylation mixture comprising acetic anhydride, a diluent therefor which is a non-solvent for cellulose acetate and is present in amount such that the acetylation mixture as a whole is a non-solvent for cellulose acetate, and a catalyst for the acetylation, adding to at least the greater part of the acetylation mixture which has left the zone sufficient ketene to restore its content of acetic anhydride, and returning to the acetylation zone the acetylation mixture which has had its acetic anhydride content so restored.

7. A process for the continuous production of cellulose acetate, which comprises activating cellulose by a pretreatment with acetic acid, passing the pretreated cellulose through an acetylation zone in one direction, and passing through the zone in the other direction and 15 to 30 times as fast weight for weight an acetylation mixture comprising acetic anhydride, an aromatic hydrocarbon in amount such that the acetylation mixture as a whole is a non-solvent for cellulose acetate, and an acid acetylation catalyst selected from the group which consists of sulphuric and perchloric acids, adding to at least the greater part of the acetylation mixture which has left the zone sufficient ketene to restore its content of acetic anhydride, and returning to the acetylation zone the acetylation mixture which has had its acetic anhydride content so restored.

8. Process according to claim 1, wherein the esterification mixture is brought into contact with and removed from a batch of cellulose at a rate such that, by the time esterification is complete, the cellulose has been in contact with 15 to 30 times its weight of esterification mixture.

9. Process according to claim 2, wherein the acetylation mixture is brought into contact with and removed from a batch of cellulose at a rate such that, by the time acetylation is complete, the cellulose has been in contact with 15 to 30 times its weight of acetylation mixture.

10. Process according to claim 9, wherein the acetylation mixture comprises, besides acetic anhydride, an aromatic hydrocarbon as diluent and an acid acetylation catalyst selected from the group which consists of sulphuric and perchloric acids.

WALTER HENRY GROOMBRIDGE.
HAROLD BATES.
JAMES WOTHERSPOON FISHER.

REFERENCES CITED

The following references are of record in the file of this patent:

UNITED STATES PATENTS

| Number | Name | Date |
|---|---|---|
| 1,816,564 | Burghart | July 28, 1931 |
| 2,098,228 | Clarke et al. | Nov. 9, 1937 |
| 2,143,332 | Sindl | Jan. 10, 1939 |
| 2,337,137 | Thompson et al. | Dec. 21, 1943 |
| 2,433,552 | Haney et al. | Dec. 30, 1947 |